United States Patent [19]

Yasuji

[11] Patent Number: 4,802,682
[45] Date of Patent: Feb. 7, 1989

[54] STORAGE DEVICE ON MOTORCYCLE

[75] Inventor: Kitasei Yasuji, Saitama, Japan

[73] Assignee: Honda Giken Kogyo Kabushiki Kaisha, Tokyo, Japan

[21] Appl. No.: 89,159

[22] Filed: Aug. 25, 1987

[30] Foreign Application Priority Data

Sep. 29, 1986 [JP] Japan .................... 61-149298

[51] Int. Cl.⁴ .............................................. B62J 7/02
[52] U.S. Cl. ................................. 180/219; 180/228; 224/32 R; 296/37.1
[58] Field of Search ............. 180/228, 219, 227; 280/5 A, 289 A; 296/37.1, 37.8, 37.15; 224/32 R, 32 A, 273, 275

[56] References Cited

U.S. PATENT DOCUMENTS

| | | | |
|---|---|---|---|
| 2,225,914 | 12/1940 | Lewis et al. | 180/219 |
| 3,779,597 | 12/1973 | Uchida | 296/37.1 |
| 3,788,532 | 1/1974 | Bish | 224/32 A |
| 3,882,951 | 5/1975 | Conley | 180/294 |
| 4,265,332 | 5/1981 | Presnall et al. | 180/68.1 |
| 4,428,451 | 1/1984 | Yamaoka | 180/229 |
| 4,438,877 | 3/1984 | Jackson | 224/275 |
| 4,441,574 | 4/1984 | Kohyama et al. | 180/219 |
| 4,519,473 | 5/1985 | Ochiai et al. | 180/229 |
| 4,522,442 | 6/1985 | Takenaka | 296/37.1 |
| 4,577,719 | 3/1986 | Nomura | 280/5 A |
| 4,579,190 | 4/1986 | Hashimoto et al. | 180/227 |
| 4,619,476 | 10/1986 | Kawasaki | 296/37.1 |
| 4,633,965 | 1/1987 | Tsurumi et al. | 180/229 |
| 4,666,009 | 5/1987 | Yashima | 180/219 |
| 4,679,647 | 7/1987 | Komuro | 180/219 |
| 4,721,178 | 1/1988 | Ito | 180/219 |

FOREIGN PATENT DOCUMENTS

| | | |
|---|---|---|
| 513935 | 6/1955 | Canada . |
| 2532897 | 3/1984 | France . |
| 477708 | 2/1953 | Italy . |
| 60-154964 | 8/1985 | Japan . |
| 61-201987 | 12/1986 | Japan . |
| 800488 | 8/1958 | United Kingdom . |
| 819690 | 9/1959 | United Kingdom . |
| 1537233 | 12/1978 | United Kingdom . |
| 2054477 | 2/1981 | United Kingdom . |

Primary Examiner—David M. Mitchell
Assistant Examiner—Everett G. Diederiks, Jr.
Attorney, Agent, or Firm—Lyon & Lyon

[57] ABSTRACT

A motorcycle has a rear frame extending longitudinally centrally through a motorcycle body and inclined rearwardly from a lower position to an upper position below a driver's seat. A storage device on the motorcycle includes a container disposed below the driver's seat and having a bottom wall having a bulging portion avoiding a portion of the rear frame, and a side wall extending upwardly from a peripheral edge of the bottom wall and surrounding the bottom wall, the side wall including an upper portion defining an opening which opens toward the driver's seat, hinge means through which the driver's seat is coupled to the storage device so as to serve as a cover which is openable and closable with respect to the opening.

19 Claims, 5 Drawing Sheets

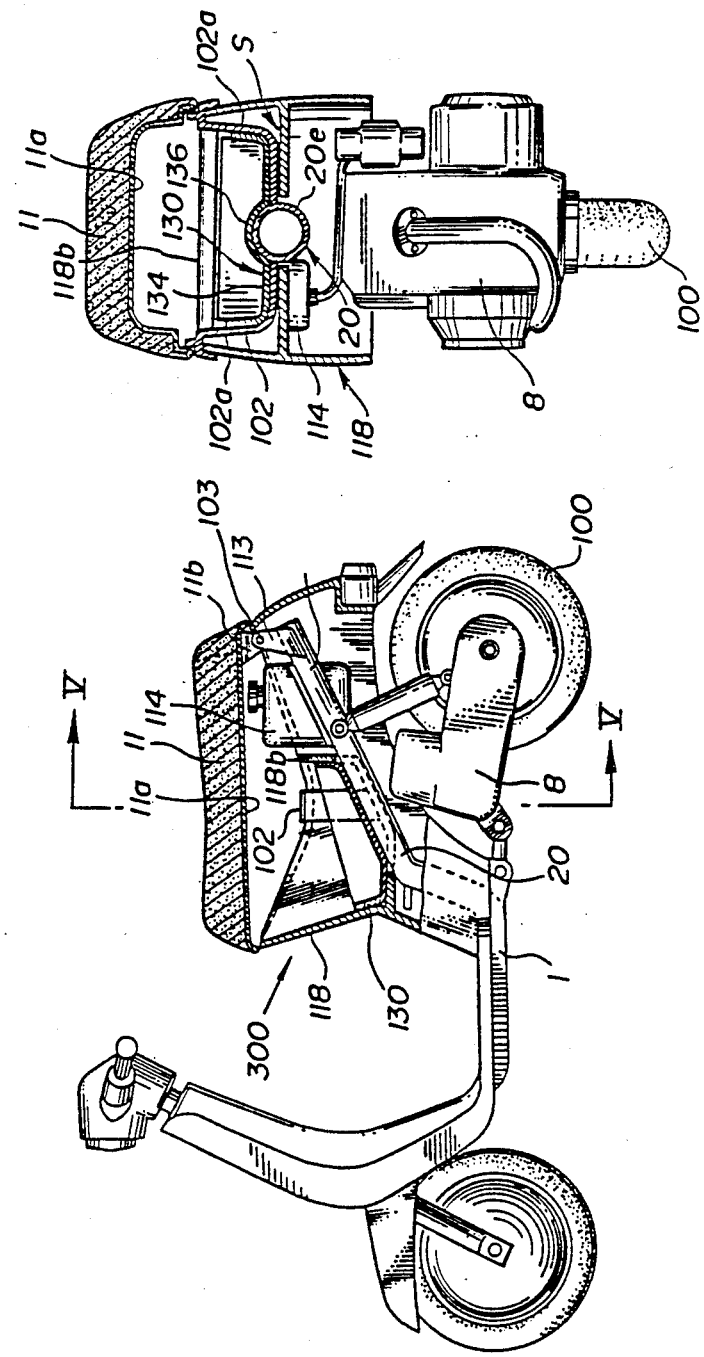

STORAGE DEVICE ON MOTORCYCLE

BACKGROUND OF THE INVENTION

The present invention relates to a storage device on a motorcycle, and more particularly to a storage device on a small-size motorcycle such as a scooter for effectively storing an article such as a driver's helmet.

There have been proposed a variety of motorcycles having storage pockets as storage devices. Small-size motorcycles, such as scooters, include relatively large components, such as a fuel tank, positioned in the rear portion of the motorcycle body. Therefore, it is difficult to provide a space for storing a large article, such as a helmet, in the motorcycle body itself because of the required aerodynamic design and frame rigidity thereof. Such storage space can only be provided in the space defined below the driver's seat or saddle.

Where a storage space having a substantially flat bottom for placing an article thereon is to be defined below the driver's seat, the storage space should be provided above a rear frame extending beneath the seat, resulting in an increased seat height.

In order to reduce the seat height, the rear frame underneath the seat may be composed of two laterally spaced side members positioned above the bottom of the storage space and extending alongside of the storage space. With this modification, however, the motorcycle body would not be of a narrow compact size, but of an increased width.

One conventional helmet storage device on a motorcycle is disclosed in Japanese Laid-Open Utility Model Publication No. 59-26089 published Feb. 17, 1984.

The disclosed storage device has a storage space provided below the driver's seat, the storage space having a size larger than the outer profile of a helmet to be stored therein. The motorcycle also includes a fuel tank disposed in the storage space and having a substantially hemispherical shape complementary to the inner profile of the helmet. The helmet is stored in the storage space below the seat while covering the fuel tank.

Although the space beneath the seat is available as the helmet storage space in the disclosed prior arrangement, the fuel tank is limited in its volume since the fuel tank is disposed in the helmet storage space and its outer shape is limited by the inner dimensions of the helmet. The above publication also shows a different embodiment in which the fuel tank is shaped to increase its volume within the storage space. According to this alternative, the fuel tank in the storage space includes a main tank portion which is of a bulging shape for supporting the helmet thereon in interfitting relation, and an auxiliary tank portion communicating with the main tank portion and doughnut-shaped in surrounding relation to the lower part of the main tank portion. The helmet stored in the storage space has its lower peripheral edge portion received in the recess defined between the main tank portion and the doughnut-shaped auxiliary tank portion. While the modified fuel tank is of an increased volume, however, its shape is complex and the storage space lacks versatility since articles other than the helmet cannot be stored thereon.

SUMMARY OF THE INVENTION

In view of the drawbacks of the conventional storage devices on motorcycles, it is an object of the present invention to provide a storage device on a motorcycle which has a storage space of an increased width that is necessary and sufficient to store a helmet or other article while utilizing the driver's seat as a cover for the storage space, so that the storage device can be of good utility while retaining a good appearance of the motorcycle.

According to the present invention, there is provided a storage device on a motorcycle having a rear frame extending longitudinally centrally through the motorcycle body and inclined rearwardly from a lower position to an upper position below the driver's seat, the storage device comprising a container disposed below the driver's seat and having a bottom wall having a bulging portion avoiding a portion of the rear frame, and a side wall extending upwardly from a periperhal edge of the bottom wall and surrounding the bottom wall, the side wall including an upper portion defining an opening which opens toward the driver's seat, hinge means through which the driver's seat is coupled to the storage device so as to serve as a cover which is openable and closable with respect to the opening.

The above and further objects, details and advantages of the present invention will become apparent from the following detailed description of preferred embodiments thereof, when read in conjunction with the accompaning drawings.

BRIEF DESCRIPTION OF THE DRAWINGS

FIG. 4 is a vertical cross-sectional view of a storage device on a motorcycle according to a second embodiment of the present invention;

FIG. 5 is a cross-sectional view taken along line V—V of FIG. 4;

DETAILED DESCRIPTION OF THE PREFERRED EMBODIMENTS

Figure 1:
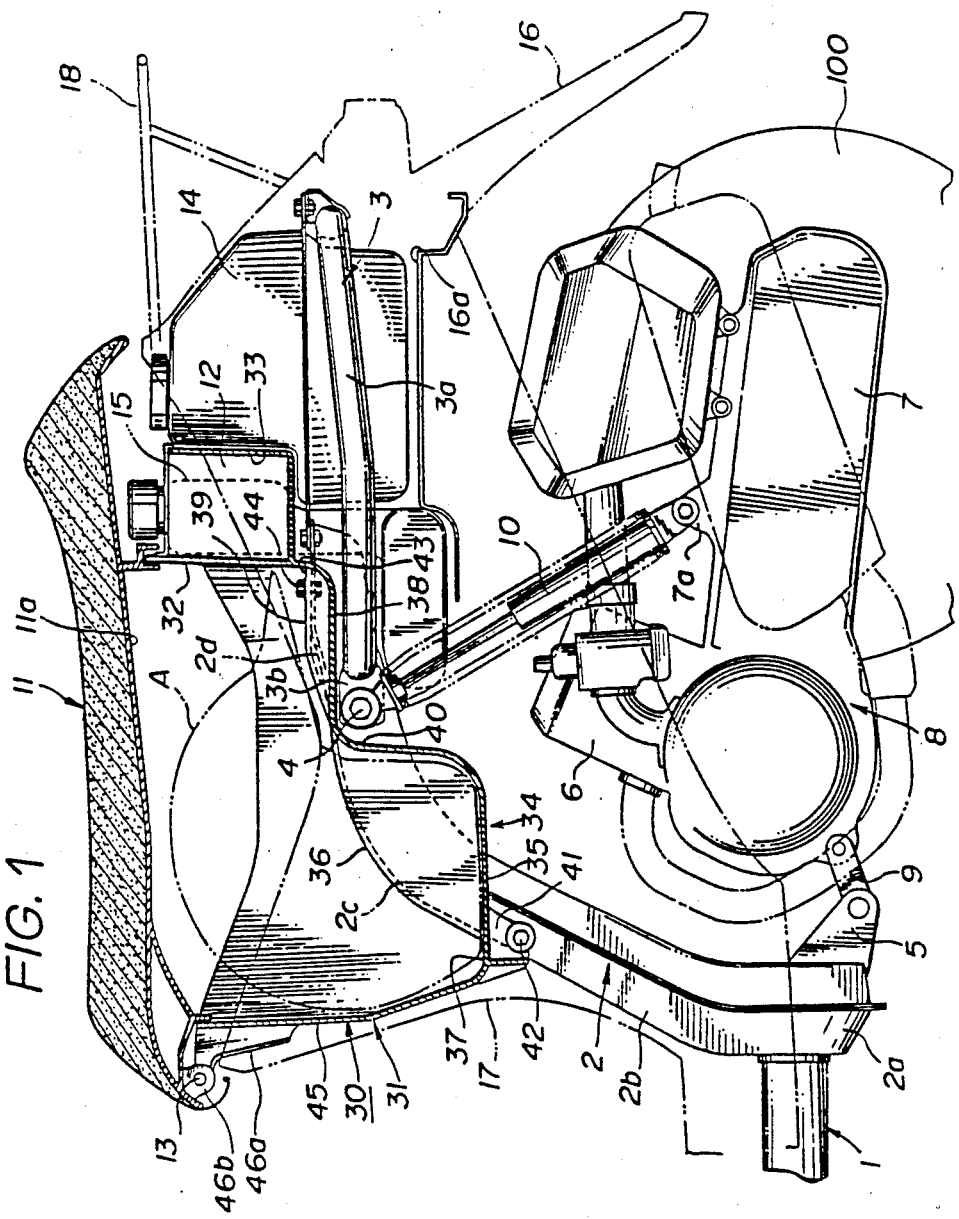
FIG. 1 is a vertical cross-sectional view of a storage device on a motorcycle according to a first embodiment of the present invention.

FIG. 1 shows in side elevation a rear portion of a motorcycle equipped with a storage device according to a first embodiment of the present invention.

As shown in FIG. 1, the main frame 1 of the motorcycle is in the form of a single pipe with its rear end joined to the front side of a lower end 2a of a rear frame 2 which is of an inverted L shape as viewed in side elevation. The rear frame 2 comprises a front portion 2b inclined rearwardly from the lower end 2a to an upper position, a curved portion 2c contiguous to the upper end of the front portion 2b and positioned at the top of the shape, a rear portion 2d extending slightly upwardly from the curved portion 2c but substantially horizontally rearwardly. The rear frame 2 is constructed of a single tubular component in the form of a pipe or two joined pieces pressed from steel sheet.

Figure 2:
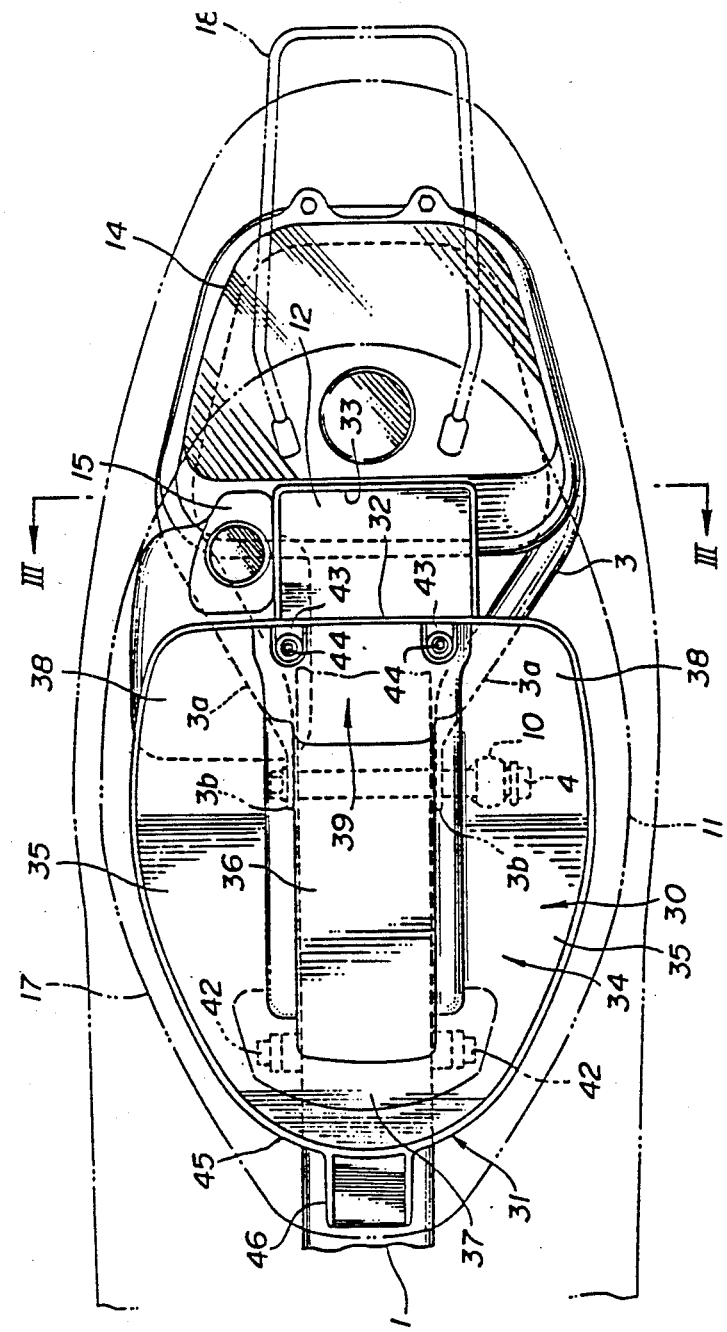
FIG. 2 is a plan view of the storage device shown in FIG. 1.

The frames 1, 2 extend longitudinally of the motorcycle body in a substantially central area in the transverse direction of the motorcycle body, as shown in FIG. 2.

A rear stay 3 of a U shape as viewed in plan has a pair of laterally spaced bars 3a having front ends 3b fastened by bolts 4 to the opposite sides of the rear frame 2 where the curved portion 2c and the rear portion 2d are joined to each other. A bracket 5 is mounted on the rear side of the lower end 2a of the rear frame 2, and a swingable power unit 8 comprising an engine 6 and a transmission case 7 has a front portion pivotally joined by a link 9 to the bracket 5. A rear wheel 100 is rotatably mounted on a rear portion of the transmission case 7, which has a bracket 7a connected to the lower end of a rear cushioning unit 10 with its upper end coupled to the attachment bolt 4 fastened to the front end 3b of one of the bars 3a of the U-shaped rear stay 3. The rear cushioning unit 10 therefore supports the power unit 8 in a cantilevered fashion, and has its upper end supported, together with the front ends 3b of the rear stay 3, on the rear frame 2.

The rear frame 2 doubles as a support post for a driver's seat 11 and a storage device 30.

The storage device 30 is disposed above the front portion 2b of the rear frame 2 and on the curved portion 2c and the rear portion 2d thereof, the storage device 30 opening upwardly. The storage device 30 is of substantially the same width as that of the seat 11 and has a longitudinal dimension slightly smaller than that of the seat 11. The storage device 30 is in the form of a container which includes a surrounding side wall 31 having a front panel curved and reduced in width in complementary relation to the shape of the seat 11 as viewed in plan, and a rear panel extending laterally outwardly and increased in width.

The storage device 30 has a bottom wall 34 including a front portion 35 displaced deeply downwardly and a rear portion 38 higher than the front portion 35. More specifically, the bottom wall 34 includes a first bulging portion 36 disposed centrally in the transverse direction of the bottom wall 34 and bulging upwardly from the front portion 35 to allow the curved portion 2c of the rear frame 2 to extend therein in the longitudinal direction, a pair of laterally spaced bottom portions 35 disposed one on each side of the bulging portion 36 and depending downwardly therefrom to a boundary area between the front and curved portions 2b, 2c of the rear frame 2, and a joint bottom portion 37 located at the lower end of the building portion 35 at the same level as the bottom portions 35 and interconnecting the front ends of the bottom portions 35 flatwise at the boundary area. The rear portion 38 of the bottom wall 34 has a second bulging portion 39 located at substantially the same level as the rear portion 2d of the rear frame 2 and bulging upwardly to allow an upper portion of the rear portion 2d to extend therein. The extent to which the second bulging portion 39 bulges upwardly is relatively small, so that the rear portion 38 is substantially flat in its entirety. The front portion 35 and rear portion 38 of the bottom wall 34 of the storage device 30 are joined to each other by means of a curved portion 40 behind which the bolt 4 connecting the upper end of the rear cushioning unit 10 to the rear frame 2 is positioned.

The side wall 31 of the storage device 30 includes a rear wall panel 32 behind which there is disposed a substantially cubic auxiliary container 33 which is joined to the rear surface of the rear wall panel 32. The auxiliary container 33 opens upwardly and serves as a battery storage box with a battery 12 stored therein.

The storage device 30 thus constructed can be installed on the rear frame 2 in the following manner.

Attachment legs 41 extend downwardly from inner panel portions of the depending bottom portions 35, i.e., from outer panel portions of the central bulging portion 36. The attachment legs 41 are held in sandwiching relation to the upper end of the front frame portion 2b and fastened by bolts 42 to the lateral panels of the lower portion of the curved portion 2c of the rear frame 2. Attachment legs 43 project from the rear wall panel 32 laterally of the bulging portion 39 of the rear bottom wall portion 38. The attachment legs 43 are fastened to the rear portion 2d of the rear frame 2 by bolts 44 which are downwardly applied.

The storage device 30 is thus installed astride the curved portion 2c and the rear portion 2d of the rear frame 2.

A bracket 46a projects forwardly from an upper portion of a front wall panel 45 of the side wall 31. A bracket 46b on the front end of the seat 11 is pivotally joined to the bracket 46a by means of a pin 13. The brackets 46a, 46b and the pin 13 jointly constitute a hinge means. The bottom panel 11a of the seat 11 thus serves as a cover for openably covering the upper opening of the storage device 30.

The bottom panel 11a of the seat 11 extends rearwardly in overhanging relation to the auxiliary container 33 and a fuel tank 14 (described below).

Figure 3:
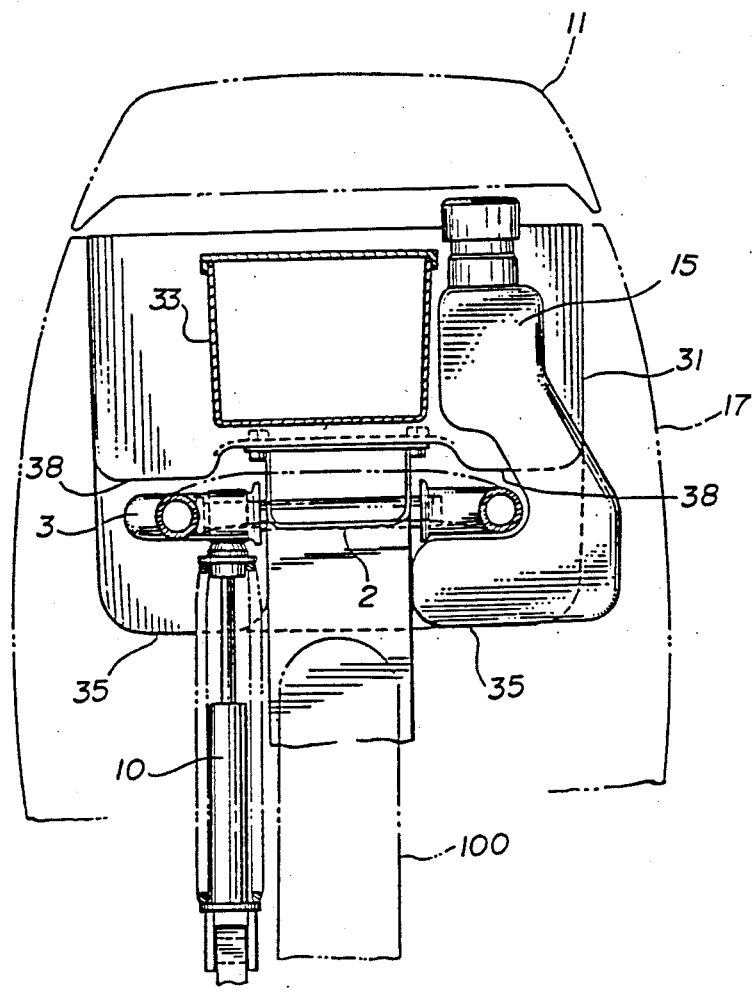
FIG. 3 is a cross-sectional view taken along line III—III of FIG. 2.

The fuel tank 14 is positioned behind the auxiliary container 33. As shown in FIG. 2, the fuel tank 14 has a lower portion surrounded by the rear stay 3. An oil tank 15 is positioned laterally of the auxiliary container 33 which is of a reduced width. As illustrated in FIG. 3, the oil tank 15 is of a shape extending downwardly from one side of the auxiliary container 33 and then inwardly around the bar 3a of the rear stay 3 below the bar 3a, thus achieving a required tank volume. The tanks 14, 15 have bottoms disposed over the top 16a of a rear fender 16.

The rear frame 2, the storage device 30, the auxiliary container 33, and the tanks 14, 15 are laterally surrounded by a rear cover 17 on which a carrier 18 is mounted.

Since the single rear frame 2 extends longitudinally through the center of the bottom wall of the storage device 30, the width of the storage device 30 may be the same as or larger than the width of the seat 11. Therefore, the storage space in the storage device 30 is large for high storage capability. For example, if a helmet A with a projecting sun visor is to be stored in the storage device 30 as shown in FIG. 1, the opposite depending pieces of the helmet are inserted toward the depending bottom portions 35 of the bottom wall 34 with the first bulging portion 36 projecting into the space in the helmet A, and the sun visor placed on the rear portion 38 of the bottom wall 34. The helmet A thus positioned is stably stored in the storage device 30.

A storage device 300 for a motorcycle according to a second embodiment of the present invention will be described with reference to FIGS. 4 through 7.

As shown in FIG. 4, the storage device 300 is positioned on a rear frame 20 of the motorcycle which is illustrated as a scooter, the rear frame 20 being inclined rearwardly from a lower position to an upper position within a rear cover 118 of the motorcycle.

Figure 6:
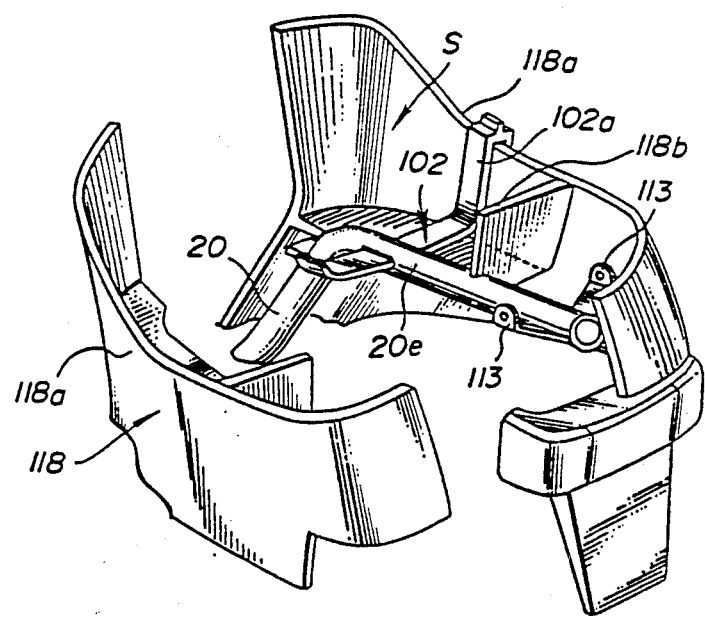
FIG. 6 is an exploded perspective view of a rear cover of the storage device of the second embodiment.

As illustrated in FIG. 6, a U-shaped stay 102 extending laterally is mounted on a front end of a rear portion 20e of the rear frame 20. The stay 102 has a pair of bars projecting laterally from the rear frame portion 20e and having two upstanding arms 102a with their upper ends bent outwardly away from each other. The bent upper ends of the upstanding arms 102a are positioned over and held in engagement with the upper edges of side members 118a of the rear cover 118. The rear cover 118 defines a space S opening upwardly and disposed below a driver's seat 11. A fuel tank 14 is disposed in a rear portion of the rear cover 118 and has a shape including a portion extending downwardly on one side of the rear portion of the rear frame 20.

Figure 7:
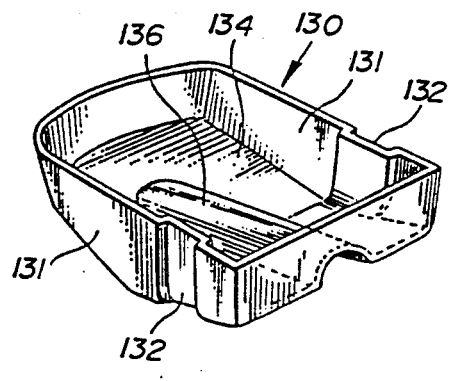
FIG. 7 is a perspective view of a storage unit of the storage device of the second embodiment.

A shallow container unit 130 as shown in FIG. 7 is disposed in the space S. The container unit 130 has a bottom wall 134 including an upwardly bulging portion 136 positioned centrally in the transverse direction of the container unit 130 and fitting complementarily over the rear frame 20. The container unit 130 also has a pair of laterally spaced side walls 131 having respective recessed portions 132 extending vertically and displaced transversely toward each other into the container unit 130. The recessed portions 132 are fitted respectively over the upstanding arms 102a of the stay 102. The container unit 130 is disposed in the space S which is defined by the rear frame 20, the stay 102, and the side members 118a and the rear wall 118b of the rear cover 118. The container unit 130 may be a molded component shaped complementarily to a configuration composed of the rear frame 20, the stay 102, and the side members 118a and the rear wall 118b of the rear cover 118.

As shown in FIG. 6, the rear cover 118 is composed of two separate bodies. The seat 11 is hinged to the rear frame 20 by brackets 113 projecting upwardly from the rear end of the rear frame 20 and brackets 11b projecting downwardly from the rear end of the bottom panel 11a of the seat 11, the brackets 113, 11b being pivotally joined by a bolt 103.

The storage device 300 of the second embodiment includes a portion of the rear cover 118 and has a sufficient storage space for storing a helmet or other article.

While the rear frame 20 in the second embodiment is shown as being a single component, it may be constructed of a plurality of joined pipes.

With the arrangement of the present invention, the storage device disposed below the driver's seat which serves as the cover is not limited in width by the rear frame which extends centrally through the storage device. Therefore, the width of the storage device may be selected to cover the width of the motorcycle or the seat thereof. The depending bottom portions of the bottom wall of the storage device may be of a desired shape which is not affected by the rear frame, thereby allowing the storage device to have increased utility for storing objects therein. The depending bottom portions of the bottom wall of the storage device are positioned in dead spaces located on opposite sides of the rear space. The storage device of the invention is thus advantageous in effective utilization of the available space in the motorcycle. A helmet can be stably stored in the storage device because it is partly received in the depending bottom portions and on the rear portion of the rear frame.

Although there have been described what are at present considered to be the preferred embodiment of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A storage device on a motorcycle having a rear frame extending substantially longitudinally centrally through a motorcycle body and being inclined rearwardly from a lower position to an upper position below a driver's seat, said storage device comprising:
    a container disposed below said driver's seat and having a bottom wall containing a bulging portion defining a longitudinally extending recess to receiver a portion of said rear frame, and means forming a side wall extending upwardly from the peripheral edge of said bottom wall about said bottom wall, said side wall means defining an opening at the upper end thereof which opens toward said driver's seat; and
    hinge means for coupling said driver's seat to said storage device, whereby said driver's seat serves as a cover which is openable and closeable with respect to said opening.

2. A storage device according to claim 1, wherein said rear frame has, below said driver's seat, a first frame portion extending rearwardly from a lower position to an upper position, a second curved frame portion contiguous to said first frame portion, and a third frame portion contiguous to said second curved frame portion and extending substantially horizontally, said bottom wall of the container having said bulging portion shaped to avoid said second frame portion, a pair of depending bottom portions disposed one on each side of said bulging portion and depending from said bulging portion to a boundary area between said first and second frame portions, a joint bottom portion interconnecting front ends of said depending bottom portions at said boundary area, and an upper bottom portion located at substantially the same level as said third frame portion and positioned higher than said depending bottom portions.

3. A storage device according to claim 2, wherein said bottom wall has a pair of first attachment legs extending downwardly therefrom near said joint bottom portion, said first attachment legs sandwiching an upper end portion of said first frame portion therebetween and being fastened to each other by a bolt, said upper bottom portion having a second attachment leg on a rear portion thereof, said second attachment leg being fastened by a bolt to said third frame portion extending therebelow.

4. A storage device according to claim 3, wherein said container includes a side wall having a front panel and a rear panel, said side wall having a cross-sectional shape which is of an outer profile that is substantially the same as a shape of said driver's seat as viewed in plan.

5. A storage device according to claim 4, wherein said rear panel of the side wall has a substantially cubic auxiliary container joined to a rear surface thereof, said rear frame including a rear stay of a U-shape as viewed in plan, coupled to a rear end of said third frame portion, said auxiliary container and a fuel tank being disposed within the region bounded by said rear stay.

6. A storage device according to claim 4, wherein said hinge means comprises a first bracket mounted on a front end of said driver's seat, a second bracket projecting forwardly from an upper end of said front panel of the side wall, and a pin by which said first and second brackets are pivotally joined to each other.

7. A storage device according to claim 1, further including a rear cover having a surrounding side wall defining a space which accommodates therein said container.

8. A storage device according to claim 7, further including a stay having a pair of bars projecting laterally from said rear frame and a pair of upstanding arms extending upwardly from outer ends of said bars, respectively, and having upper ends engaging upper edges of said side wall of the rear cover, and a third bracket mounted on a rear portion of said rear frame, said hinge means comprising a fourth bracket mounted on a rear end of said driver's seat, and a pin by which said third and fourth brackets are pivotally coupled to each other.

9. A storage device according to claim 8, wherein container comprises a molded component shaped complementarily to a configuration composed of the side wall of the cover, the rear frame, and the stay.

10. A storage device on a motorcycle having a body frame including a rear frame member extending substantially longitudinally centrally of said body frame and being upwardly inclined rearwardly from a lower position to an upper position below a driver's seat, said storage device comprising:
a container disposed below said driver's seat and having a bottom wall,
a bulging portion in said bottom wall defining a substantially longitudinally extending recess to receive said rear frame member, and
substantially upstanding wall means extending upwardly from said bottom wall about the periphery thereof, said wall means having an opening at the upper end thereof beneath said driver's seat.

11. A storage device according to claim 10 particularly adapted for storage of a helmet wherein said helmet is adapted for positioning in said container in straddling relation to said bulging portion therein.

12. A storage device according to claim 11 including means for pivotally mounting said driver's seat to said wall means for closing said opening.

13. A storage device according to claim 12 wherein the horizontal profile of said wall means conforms generally to the horizontal sectional shape of said driver's seat.

14. A storage device according to claim 12 wherein said rear frame includes a vertically extending portion and a horizontally extending portion longitudinally connected to said vertically extending portion and wherein said bulging portion divides said container bottom wall into a pair of bottom portions depending from said bulging portion each on opposite sides of said rear frame.

15. A storage device according to claim 14 wherein said motorcycle includes a rear cushioning unit having one end pivotally connected to said rear frame and wherein said container bottom wall adjacent said depending portions is sufficiently spaced with respect to said rear frame to accommodate connection of said cushioning unit to said rear frame.

16. A storage device according to claim 14 including means for attaching said container to said rear frame.

17. A storage device according to claim 16 wherein said attaching means include laterally spaced first attachment legs depending from said container bottom wall on opposite sides of said recess, and means for connecting said first attachment legs to said rear frame.

18. A storage device according to claim 17 wherein said attaching means include second attachment legs longitudinally spaced from said first attachment legs and means for connecting said second attachment legs to said rear frame.

19. A storage device on a motorcycle particularly adapted for storing a helmet, said motorcycle having a body frame including a rear frame member extending substantially longitudinally centrally of said body frame and being upwardly inclined rearwardly from a lower position to an upper position below the driver's seat, said storage device comprising:
a container disposed below said driver's seat having generally upstanding walls arranged to receive said helmet;
said container having a bottom wall disposed in facing relation to the interior of said helmet; and
a bulging portion in said bottom wall extending into the interior of said helmet and defining a substantially longitudinally extending recess receiving said rear frame member.

* * * * *

UNITED STATES PATENT AND TRADEMARK OFFICE
CERTIFICATE OF CORRECTION

PATENT NO. : 4,802,682
DATED : February 7, 1989
INVENTOR(S) : YASUJI KITASEI

It is certified that error appears in the above-identified patent and that said Letters Patent is hereby corrected as shown below:

In the caption of the patent, please reverse the name of the inventor to read -- Yasuji Kitasei --.

Item [19] "Yasuji" should read --Kitasei--.

Signed and Sealed this

Third Day of October, 1989

Attest:

DONALD J. QUIGG

Attesting Officer

Commissioner of Patents and Trademarks